US007347981B2

(12) United States Patent
Crespi et al.

(10) Patent No.: US 7,347,981 B2
(45) Date of Patent: Mar. 25, 2008

(54) DIRECTED FLOW METHOD AND SYSTEM FOR BULK SEPARATION OF SINGLE-WALLED TUBULAR FULLERENES BASED ON HELICITY

(75) Inventors: Vincent H. Crespi, State College, PA (US); Aleksey N. Kolmogorov, State College, PA (US); James C. Ellenbogen, McLean, VA (US); Monika H. Schleier-Smith, McLean, VA (US)

(73) Assignees: The Penn State Research Foundation, University Park, PA (US); The Mitre Corporation, McLean, VA (US)

( * ) Notice: Subject to any disclaimer, the term of this patent is extended or adjusted under 35 U.S.C. 154(b) by 251 days.

(21) Appl. No.: 10/669,337

(22) Filed: Sep. 25, 2003

(65) Prior Publication Data

US 2005/0067349 A1    Mar. 31, 2005

(51) Int. Cl.
 *B82B 3/00* (2006.01)
(52) U.S. Cl. .................. 423/447.1; 977/845; 423/461; 210/660; 210/248; 209/156
(58) Field of Classification Search ................ 423/461; 977/DIG. 1, 845
See application file for complete search history.

(56) References Cited

U.S. PATENT DOCUMENTS

| | | | |
|---|---|---|---|
| 5,300,203 A | 4/1994 | Smalley | |
| 5,338,529 A | 8/1994 | Pirkle et al. | |
| 5,487,831 A | 1/1996 | Pirkle et al. | |
| 5,560,898 A | 10/1996 | Uchida et al. | |
| 5,695,734 A | 12/1997 | Ikazaki et al. | |
| 5,698,174 A | 12/1997 | Müller et al. | |
| 5,711,927 A | 1/1998 | Atwood et al. | |
| 5,851,503 A | 12/1998 | Mitani et al. | |
| 5,904,852 A | 5/1999 | Tour et al. | |
| 6,303,016 B1 | 10/2001 | Diener et al. | |
| 6,331,262 B1 | 12/2001 | Haddon et al. | |
| 6,333,016 B1 | 12/2001 | Resasco et al. | |
| 6,368,569 B1 | 4/2002 | Haddon et al. | |
| 6,423,583 B1 | 7/2002 | Avouris et al. | |
| 6,669,918 B2* | 12/2003 | Schleier-Smith et al. | 423/447.1 |
| 6,841,139 B2 | 1/2005 | Margrave et al. | |
| 2001/0004471 A1 | 6/2001 | Zhang | |

OTHER PUBLICATIONS

Chen, R., et al. "Noncovalent sidewall functionalization of single-walled carbon nanotubes for protein immobilization", J. Am. Chem. Soc., 2001, 123 pp. 3838-3839.

Collins, P., et al., "Engineering carbon nanotubes and nanotube circuits using electrical breakdown", Science, Apr. 27, 2001, vol. 292, pp. 706-709.

Krupke, R., et al., "Separation of metallic from semiconducting single-walled carbon nanotubes", Science, Jul. 18, 2003; vol. 301, pp. 344-347.

Liu, J., et al., "Fullerene Pipes", Science, May 22, 1998, vol. 280, pp. 1253-1256.

Georgakilas, V., et al. "Organic Functionalization of Carbon Nanotubes", J. Am. Chem. Soc., vol. 124, No. 5, 2002, pp. 760-761.

Huang, Y., et al., "Directed assembly of one-dimensional nanostructures into functional networks", Science, Jan. 26, 2001, vol. 291, pp. 630-633.

Buogiorno Nardelli, M., et al., "Mechanism of Strain Release in Carbon Nanotubes", Phys. Rev. B, vol. 57, No. 8, 1998, pp. 4277-4280.

Zheng, M., et al., "DNA-assisted dispersion and separation of carbon nanotubes", Nature Materials, May 2003, vol. 2, No. 5, pp. 338-342, Advance Online Publication, Apr. 6, 2003, www.nature.com/naturematerials, doi:10.1038/nmat877, pp. 1-5.

O'Connell, M., et al., "Band gap fluorescence from individual single-walled carbon nanotubes", Science, Jul. 26, 2002, vol. 297, pp. 593-596.

Zhang, P., et al., "Plastic deformations of carbon nanotubes", Phys. Rev. Lett. vol. 81, No. 24, Dec. 14, 1998, pp. 5346-5349.

Yakobson, B., et al. "Mechanical relaxation and "intramolecular plasticity" in carbon nanotubes", Appl. Phys. Lett. vol. 72, No. 8, 1998, pp. 918-920.

Stone, H., et al., "Microfluidics: Basic issues, applications, and challenges", AIChE Journal, vol. 47, No. 6, Jun. 2001, pp. 1250-1254.

Service, R., "Nanotechnology. Sorting technique may boost nanotube research", Science, Jun. 27, 2003, vol. 300, p. 2018.

(Continued)

*Primary Examiner*—Stuart Hendrickson
(74) *Attorney, Agent, or Firm*—Rosenberg, Klein & Lee

(57) ABSTRACT

A method for bulk separation of single-walled tubular fullerenes (100) based on helicity is provided wherein a solution or suspension of the single-walled tubular fullerenes (100) is flowed onto a crystalline or highly oriented substrate (30). The single-walled tubular fullerenes (100) that flow onto the substrate (30) have a respective longitudinal axis that is aligned with the flow direction (105). The direction of flow (105) is oriented at a predetermined angle with respect to a lattice axis (24) of the substrate (30) for energetically favoring adsorption of a respective plurality of single-walled fullerenes (100) having a tubular contour and a selected helicity. Subsequently, the adsorbed single-walled tubular fullerenes (100) of the selected chirality are removed from the substrate (30).

19 Claims, 10 Drawing Sheets

OTHER PUBLICATIONS

Diehl, M., et al., "Self-assembled, deterministic carbon nanotube wiring networks", Angew. Chem. Int. Ed. Engl., Jan. 18, 2002, vol. 41, No. 2, pp. 353-356.

Star, A., et al., "Dispersion and solubilization of single-walled carbon nanotubes with a hyperbranched polymer" Macromolecules, 2002, vol. 35, pp. 7516-7520.

Huczko, A., "Synthesis of Aligned Carbon Nanotubes", Applied Physics A, vol. 74, 2002, pp. 617-638.

Chen, J., et al., "Solution properties of single-walled carbon nanotubes", Science, Oct. 2, 1998, vol. 282, pp. 95-98.

Cabodi, M., et al., "Entropic recoil separation of long DNA molecules", Analytical Chemistry, Oct. 15, 2002, vol. 74, No. 20, pp. 5169-5174.

Star A, et al., "Preparation and Properties of Polymer-Wrapped Single-Walled Carbon Nanotubes", Angew. Chem. Int. Ed. Engl., May 4, 2001, vol. 40, No. 9, pp. 1721-1725.

Lynch, M., et al., "Organizing Carbon Nanotubes with Liquid Crystals", Nano Letters, vol. 2, No. 11, 2002, pp. 1197-1201.

Harte, A., "Liquid Crystals Allow Large-Scale Alignment of Carbon Nanotubes", CURJ, Nov. 2001, vol. 1, No. 2, pp. 44-49.

Yanagi, H., et al., "Self-Orientation of Short-Walled Carbon Nanotubes Deposited on Graphite", J. Appl. Phys., vol. 78, No. 10, 2001, pp. 1355-1357.

Pompeo, F., et al., "Water-solubilization of single-walled carbon nanotubes by functionalization with glucosamine", NanoLetters vol. 2, No. 4, 2002, pp. 369-373.

* cited by examiner (10,10) SWNT-CONH-4-C_6H_4(CH_2)_{13}CH_3

DIRECTED FLOW METHOD AND SYSTEM FOR BULK SEPARATION OF SINGLE-WALLED TUBULAR FULLERENES BASED ON HELICITY

The invention disclosed herein was made with government support under Grant No. DMR9876232. The government has certain rights in this invention.

BACKGROUND OF THE INVENTION

FIELD OF THE INVENTION

This invention directs itself to a method and system for bulk separation of single-walled tubular fullerenes based on their helicities. More in particular, the present invention is directed to a method and system of bulk separation which takes advantage of a phenomenon wherein tubular fullerenes self-orient on a similar, but planar lattice structure in an angular orientation which varies as a function of the helicity of the tubular fullerene. Still further, the present invention is directed to a system for carrying out a method for bulk separation of single-walled tubular fullerenes that are directed in a flow across a crystalline or highly oriented substrate at a predetermined angle with respect to the lattice structure of the substrate, utilizing it to adsorb single-walled tubular fullerenes of a predetermined helicity thereon.

PRIOR ART

Tubular fullerenes and, in particular, carbon nanotubes are of great interest because of their unique electrical and mechanical properties for use in constructing nanoscale electronic circuitry and mechanical devices. It has been discovered that the mechanical and electrical properties of a carbon nanotube vary as a function of its helicity, the angle at which the graphitic lattice spirals about the tubular contour of the nanotube. Electrical properties of carbon nanotubes can vary between metallic, highly conductive structures and those which are semiconducting. One of the major hurdles to commercial utilization of these unique structures has been the problem of synthesizing the structures in a desired helicity. Currently, the synthesis of carbon nanotubes produces a mixture of helicities, although techniques exist to synthesize nanotubes in a desired range of diameters. Separating nanotubes of a desired helicity from all those produced has required a very tedious and inefficient mechanical separation process utilizing a nanoprobe (e.g., an atomic force microscope). Thus, even for laboratory use, separation of a desired helicity from all those which are produced is a painstakingly slow process.

One recent approach which permits the selective preservation of the semiconducting types of nanotubes in bundles, or "ropes," of aligned single-walled carbon nanotubes has been demonstrated by IBM Corp (P. G. Collins et al., "Engineering Carbon Nanotubes And Nanotube Circuits Using Electrical Breakdown," *Science,* Vol. 292. pgs. 706-709, 2001. In that method, ropes of nanotubes of random helicities are deposited on a silicon wafer that is then covered by a dense array of source, drain and gate connections in order to form field-effect devices. Subsequently, a voltage is applied over the nanotube ropes blowing out and destroying the metallic tubes, but leaving the semiconducting type unscathed. Thus, the surviving semiconducting nanotubes are available and still affixed as ropes to the contacts, where they may be utilized to produce active devices. However, the method provides no means of physically segregating or sorting the nanotubes into separate assemblies or containers. Nor does it provide a means for accumulating the highly conductive nanotubes. More importantly, this approach does not apply at all to the problem of sorting the nanotubes according to their helical structure. Another recent publication, Yanagi H. et al., "Self-orientation of Short Single-Walled Carbon Nanotubes Deposited on Graphite," *Applied Physics Letters,* Vol. 78, No. 10, 5 Mar. 2001, discloses an experiment where semiconducting carbon nanotubes were dropped onto a highly oriented pyrolytic graphite substrate. Clusters of nanotubes were found to spontaneously aggregate with their tube axes at specific angles with respect to the hexagonal axes of the substrate.

Other more recent developments in the art sort carbon nanotubes using secondary characteristics that are a consequence of helicity. One reported method uses DNA to assist in dispersion of carbon nanotubes that are subsequently separated based on their electronic properties using an ion-exchange chromatography, as discussed in Zheng M et al., "DNA-Assisted Dispersion and Separation of Carbon Nanotubes," *Nature Materials Advance Online Publication,* 6 Apr. 2003, pgs. 1-5. Another method separates metallic and semiconductive carbon nanotubes from each other using alternating current dielectrophoresis, as discussed in Krupke R. et al., "Separation of Metallic from Semiconducting Single-Walled Carbon Nanotubes," *Science,* Vol. 301, pgs. 344-347, 2003.

Whereas the invention of the subject Patent Application utilizes a direct interaction of the helical surface of the desired nanotubes themselves. In this way, a method is provided where nanotubes of specific helicities can be physically sorted or separated in bulk quantities from the typical mixture of nanotube types synthesized by current methods. The method described herein provides advantages over the prior art methods. The method of the present invention provides a means to separate nanotubes of a particular helicity, not just the separation of semiconductive from metallic nanotubes. The method of the invention of the subject Patent Application is therefore much more flexible and specific in its sorting ability, while being simpler to implement than prior art methods.

SUMMARY OF THE INVENTION

A directed flow method for bulk separation of single-walled tubular fullerenes based on helicity, is provided. The method includes the steps of:

providing a plurality of single-walled tubular fullerenes;
providing a substrate having a lattice structure;
flowing said plurality of single-walled tubular fullerenes on the substrate at a predetermined angle with respect to an axis of the lattice structure of the substrate, wherein single-walled tubular fullerenes of a predetermined helicity are attracted and held to the substrate; and,
removing said single-walled tubular fullerenes held to the substrate.

From another aspect, a system for bulk separation of single-walled tubular fullerenes based on helicity is provided that includes a container of a fluid bearing single-walled tubular fullerenes, the single-walled tubular fullerenes each having a longitudinal axis. A dispensing assembly is included that has at least one outlet for discharging the fluid bearing single-walled tubular fullerenes and at least one inlet coupled in fluid communication with the container. Also, a substrate having a lattice structure is provided, the lattice structure of the substrate having a selected axis disposed in a predetermined angular relationship with respect to the flow from the at least one outlet of the dispensing assembly, wherein single-walled tubular fullerenes of a predetermined helicity flowing over the substrate are attracted and held thereto. Further, a drainage assembly disposed adjacent to the substrate is included for carrying off any of the fluid containing single-walled tubular fullerenes not held on the substrate.

DETAILED DESCRIPTION OF THE PREFERRED EMBODIMENTS

In order to continue the present trend in miniaturization of electronics, it will be necessary to construct computer circuits on a molecular-scale. To that end, there has been much research in the use of single-walled tubular fullerenes, particularly carbon nanotubes, as both interconnecting conductors and as active devices in molecular-scale circuits. These molecular structures are of interest because of their unique electrical properties which may be metallic, and highly conductive, or semiconducting. Whether a tubular fullerene exhibits metallic or semiconducting properties is related to the helicity of the tubular structure. Present methods of tubular fullerene synthesis produce a mixture of helicities, typically in a ratio of two-thirds having a semiconducting characteristic and one-third having a metallic characteristic.

Helicity is the degree of "twist" or "spiral" in the lattice structure of a nanotube, and is described by an angle (helical angle), as will be further described hereinafter. This characteristic is also referred to as the "chiral angle" or "chirality", and the two terminologies are equivalent in their meanings as applied to the structure of tubular fullerenes. However, in other fields, such as molecular biology, the term "chiral" refers specifically and only to the left-handedness or right-handedness of mirror image molecular structures. In order to avoid any confusion, the terms "helical angle" and "helicity" have been adopted for use herein.

Figure 1A:
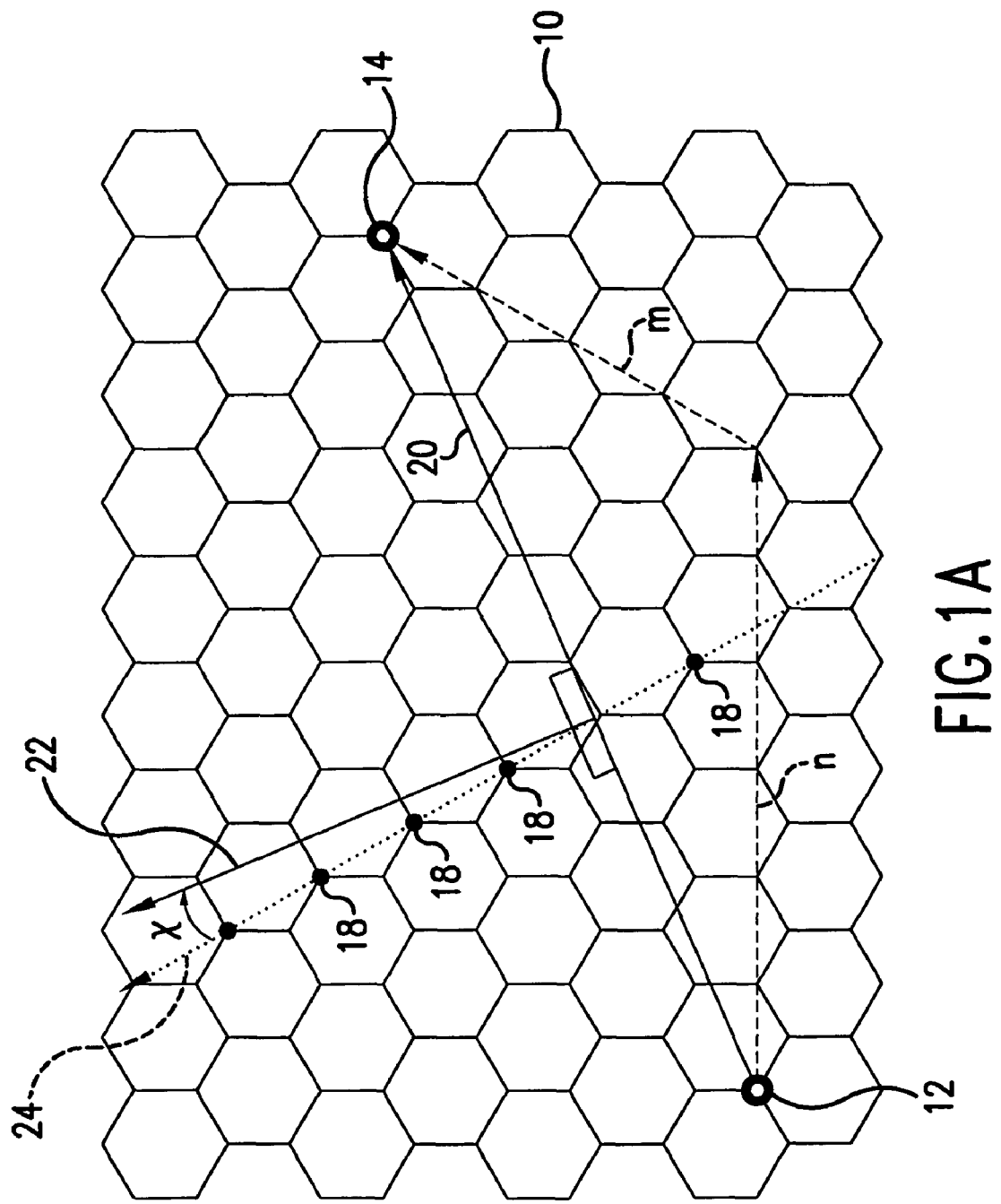
FIG. 1A is a diagram illustrating the derivation of the helical angle.

To better illustrate the concept of helicity, reference is now made to FIG. 1A. In FIG. 1A, the planar lattice 10 is shown wherein an arbitrary atom 12 defines the origin for the helical vector 20 that extends from atom 12 to another atom 14 on the lattice which would coincide with the atom 12 if the planar lattice were rolled to form a nanotube. The helical vector 20 is the summation of n times a first unit vector $a_1$ and m times a second unit vector $a_2$, where the unit vectors are defined from the hexagonal geometry of the lattice, as is well known in the art. Thus, n and m are integers in the vector equation:

$$R = na_1 + ma_2 \qquad (1)$$

Therefore, the axis 22 of the nanotube is defined as a line projecting orthogonally from the helical vector 20. In the specific instance of FIG. 1A, the vector description for the nanotube defined by vector 20 is a (6,4) nanotube. Where n does not equal m, the axis of the lattice 24, a line projected through corresponding atoms 18 of the lattice, does not coincide with the axis of the nanotube 22, such deviating by the helical angle $\chi_{(n,m)}$.

Figure 1B:
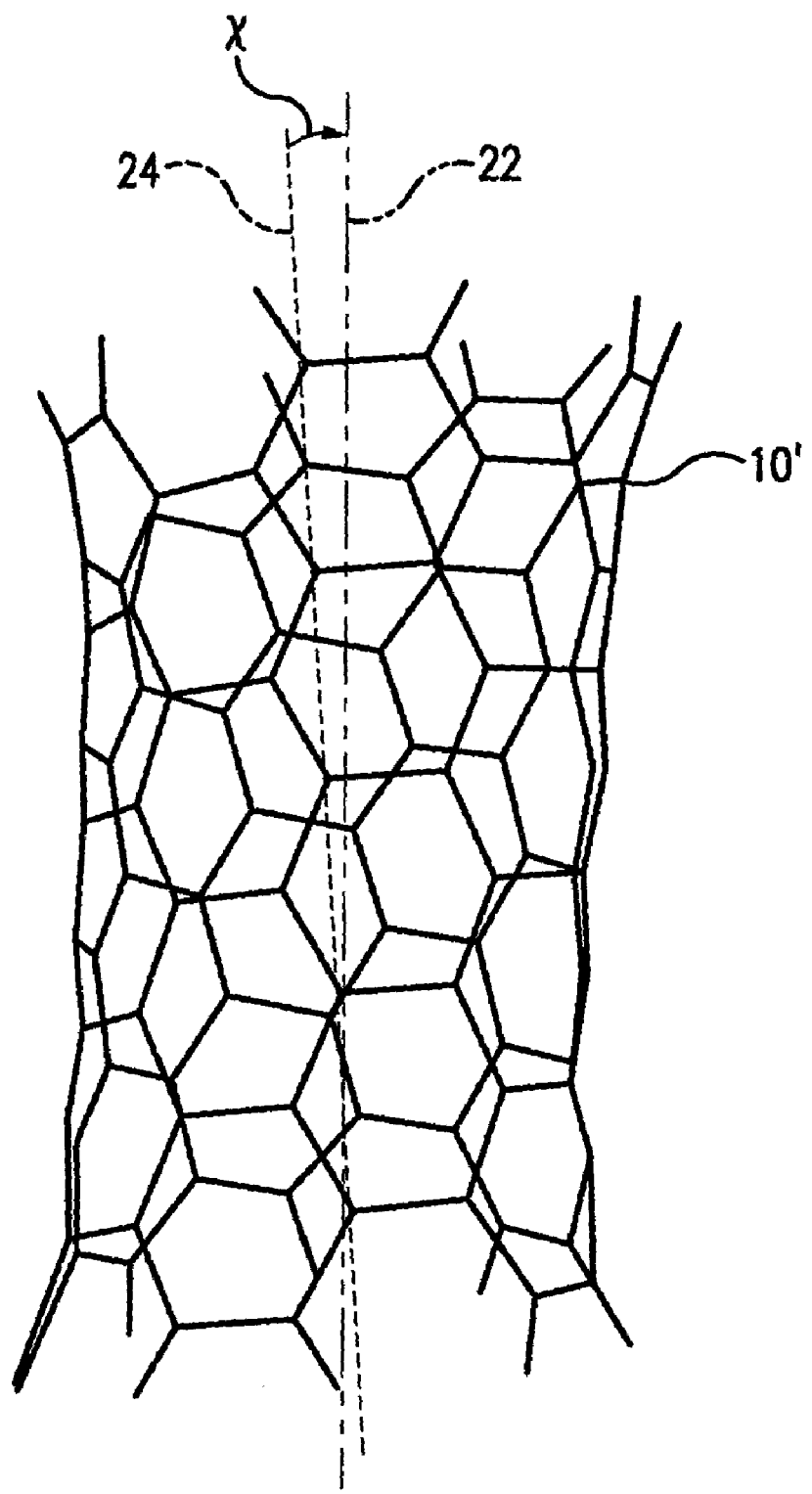
FIG. 1B is a perspective view of a tubular fullerene illustrating the helicity thereof.

In FIG. 1B, the tubular fullerene 100 represents the resulting structure obtained when the lattice 10 is rolled, as previously described. The single-walled carbon nanotube has a longitudinal axis 22 with a lattice axis 24 which deviates from the longitudinal axis of the nanotube by the helical angle, as previously described.

Figure 2:
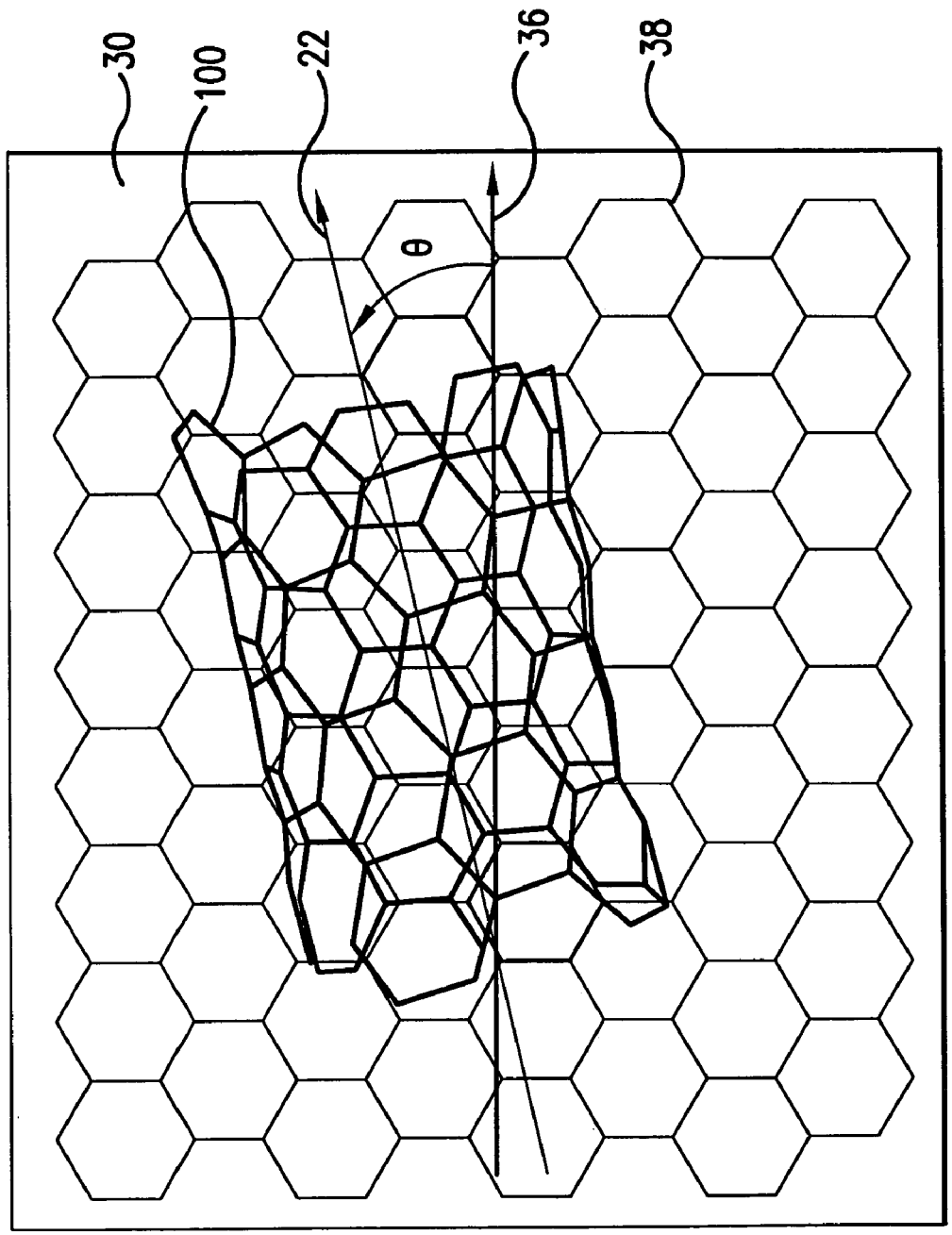
FIG. 2 is a schematic illustration of a tubular fullerene self-orienting on a substrate lattice.

To further illustrate the principles upon which the method of bulk separation of single-walled tubular fullerenes is based, reference is now made to FIG. 2. In FIG. 2, a tubular fullerene 100 is disposed on a crystalline or highly oriented substrate 30. In this case, a carbon nanotube is illustrated as being disposed on a graphite substrate, the structures of each being formed by hexagonal lattices. Where the two structures have the same lattice structure, the tubular fullerene has an energetically favored orientation wherein the hexagonal lattices of the tubular fullerene and the substrate are mutually aligned. That is, they are said to be disposed in registry with one another. Therefore, as the tubular fullerene 100 is formed by a lattice with a helical twist, the axis 22 of the tubular fullerene 100 is angularly displaced with respect to a longitudinal axis 36 of the substrate lattice 38. The angular orientation of the tubular fullerene axis 22 relative to the substrate lattice axis 36 is an angle $\Theta$ which is equal to the helical angle $\chi$. The angle $\Theta$ is also referred to as the "locking angle", as it is the angle where the nanotube establishes an equilibrium orientation with a very sharp energy minimum that leads to molecular-scale locking of the nanotube. That energy profile repeats every 60°, reflecting the lattice symmetry of the crystalline or highly oriented substrate. In addition to these "lowest order" locking angles at which the lattices of the tube and substrate coincide with the shortest possible periodicity, a small set of additional "higher order" locking angles can occur in which the lattice of the tube and the substrate possess a higher-order alignment which repeats with a longer period. Therefore, when tubular fullerenes are deposited on a substrate lattice with substantially the same lattice structure, as when carbon nanotubes are deposited on a graphite substrate, nanotubes of different helicities will be self-organized at different and stable angular orientations. The binding energy between carbon nanotubes and a crystalline or highly oriented carbon substrate at the preferred orientations recently has been calculated and found to be five to ten times greater than previously suspected. That result provides the basis for the bulk separation method and apparatus of the instant invention.

Raw fullerene nanotubes usually are produced in the form of long, tangled ropes of many nanotubes, which are held in close contact by strong van der Waals interactions. As is well known in the art, the nanotube ropes can be separated and cut to form individual shorter open-end tubular fullerenes by sonication in a 3:1 mixture of concentrated sulfuric and nitric acids (98% and 70%, respectively) at 40° Centigrade. The thus produced "fullerene pipes" are more manipulable and better suited for use in molecular electronics, and for being functionalized to improve the solubility thereof, as will be discussed in following paragraphs.

Figure 3:
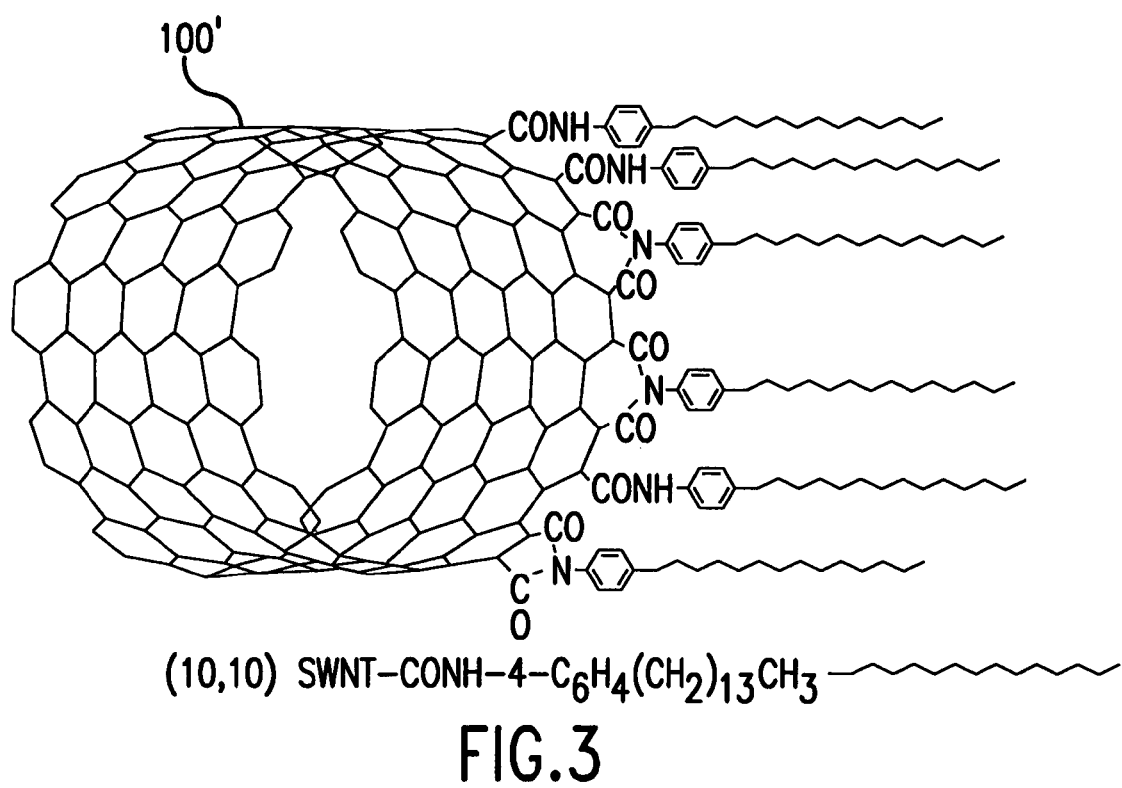
FIG. 3 is a schematic illustration of the structure of an end functionalized single-walled tubular fullerene useful in the practice of the present invention.

The solubility of the tubular fullerenes may be enhanced by functionalizing the tubular fullerenes with long-chain amines. Tubular fullerenes 100', end-functionalized with amide groups, as illustrated schematically in FIG. 3, are disclosed in Hamon, et al., "Dissolution of Single-Walled Carbon Nanotubes," *Advanced Materials,* Vol. 11, No. 10, 1999. Such end-functionalized tubular fullerenes provide enhanced solubility without impairing deposition of the tubular fullerene on the substrate 30. Similar end functionalization is described in U.S. Pat. No. 6,187,823. Side functionalization of the tubular fullerenes, as is known in the art, without disturbing the self-orienting deposition character of the fullerenes also may be used to provide the desired enhanced solubility of the fullerenes.

Figure 4:
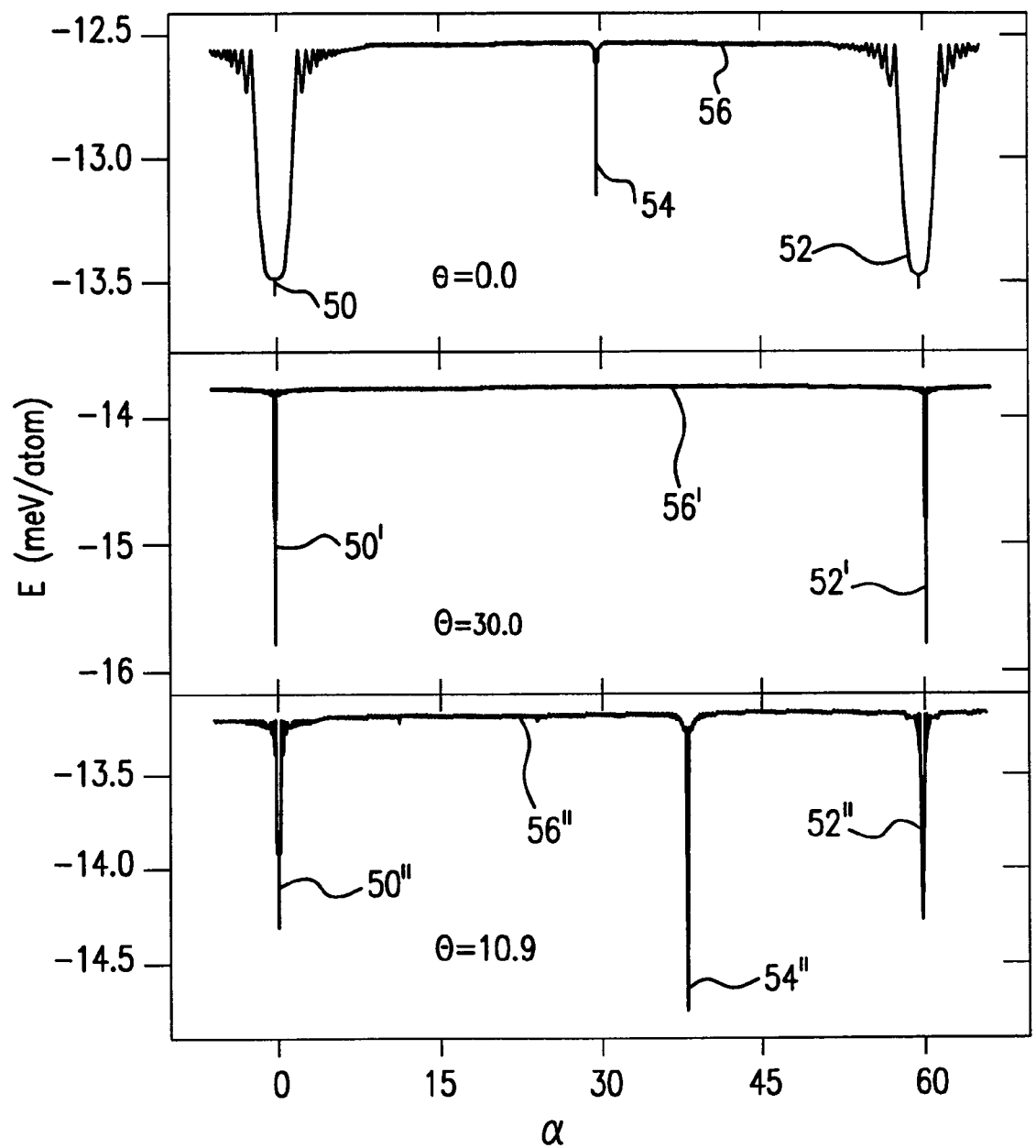
FIG. 4 is a graph illustrating the calculated nanotube-graphene interaction energy as a function of angle.

Referring now to FIG. 4, a graph is shown which represents the results of a calculation of the nanotube-graphene interaction energy as a function of angle about an axis perpendicular to the substrate. The zero angle is the angle $\Theta$, the locking angle previously described. The angle $\alpha$ is an offset angle taken with respect to the angle $\Theta$. Considering three representative nanotube helicities [a (10,0) nanotube, a (5,5) nanotube, and an (8,2) nanotube], it is shown in FIG. 4 that all nanotubes displayed maxima in their binding energy by sharp minima 50, 50', 50" in the total energy per atom of the nanotube-substrate interaction at the angle, $\alpha=0°$. The maximum binding energy value repeats at 60° intervals, as illustrated by the minima 52, 52', 52" ($\alpha=60°$ being representative of minima also found at 120°, 180°, 240°, and 300°). This repeating pattern reflects the symmetry of the substrate. In addition to this "lowest order" locking angle, the (8,2) nanotube shows a strong "higher order" locking angle illustrated by the minima 54".

The binding energy level 56, 56', 56" for the range of angles between the minima 50 and 52, 50' and 52', 50" and 52" is not entirely flat, but displays a number of small and large magnitude increases. Some of those binding energy increases come from accidental commensurations known for graphitic surfaces, as shown by the local minima 54, 54'. Other sharp local minima occur at angles which are incommensurate in the axial direction, but are effectively commensurate in the transverse direction due to the small diameter of the fullerene tube. These transverse commensurations have energy minima of much lower amplitude than the filly commensurate orientations. The calculation method utilized to compute the results of FIG. 4 is known in the art and described in a publication, A. N. Kolmogorov, V. H. Crespi, *Phys. Rev. Lett.,* 85, 4727 (2000).

It is thus seen that significant binding energy exists between the lattice of the substrate and the lattice of tubular fullerenes when such are oriented at the "locking angle" with respect to the substrate lattice, and the 60° offsets therefrom. This binding energy is much less at essentially all other such angular orientations. Besides the locking angle, the preferred angle at which the tubular fullerenes are oriented with respect to the axis of the substrate axis in the method described herein, may be at an angle which takes advantage of an energy minimum for an accidental commensuration or incommensurate orientation. In some instances it may be desirable to take advantage of the lower amplitude energy minimum associated with an accidental commensuration or incommensurate orientation for such reasons as making the removal of the adsorbed nanotubes easier, or as a first filtering step in a process that utilizes a plurality of successive separations based on the helical angle of the nanotubes.

Figure 5:
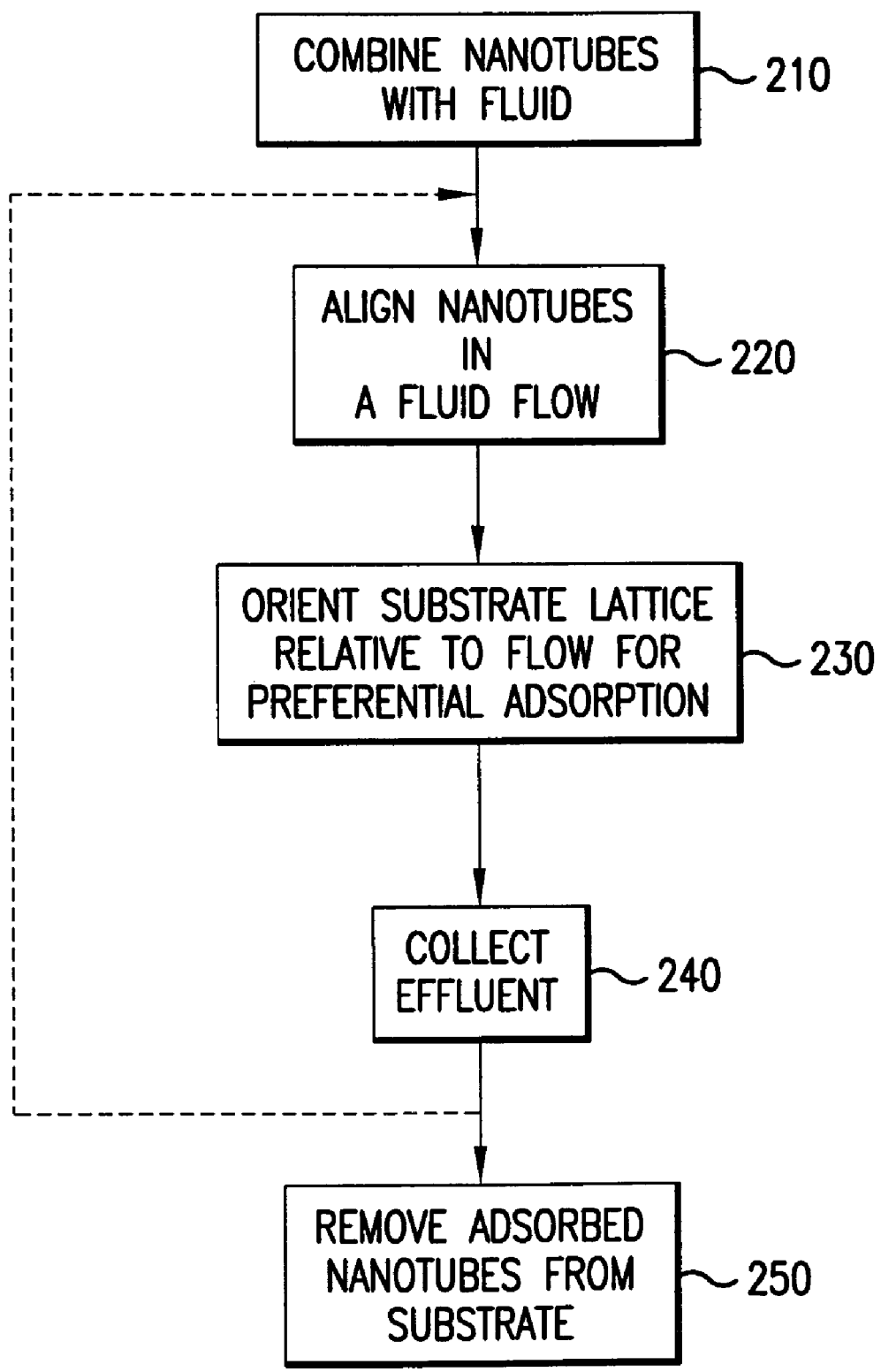
FIG. 5. is a block diagram illustrating the method of the present invention.

Turning now to FIG. 5, there is shown a block diagram illustrating the directed flow method for bulk separation of single-walled tubular fullerenes based on helicity. The tubular fullerenes are referred to as "nanotubes" and may be carbon nanotubes in particular. In block 210, a plurality of nanotubes are combined with a fluid. That combination may be achieved by forming a suspension of nanotubes or dissolving the nanotubes in a solvent. As some dissolution can occur to nanotubes suspended in a liquid and not all nanotubes may be dissolved in a solvent, the combination of nanotubes with liquid may be represented by both dissolved and suspended nanotubes. The single-walled tubular fullerenes may be placed in an aqueous suspension by the addition of a surfactant. Surfactants such as sodium dodecyl sulfate and octylphenol ethylene oxide condensate, sold under the trade name Triton X-100 by Union Carbide, are known in the art for use in forming suspensions of carbon nanotubes. The tubular fullerenes that are dissolved to form a solution may be functionalized to enhance their solubility. The tubular fullerenes may be end functionalized, as previously discussed, or side functionalized, as described in V. Georgakilas et al., "Organic Functionalization of Carbon Nanotubes," *J. Am. Chem. Soc.,* Vol. 124, No. 5, 2002. Alternately, tubular fullerenes may be enveloped in micelles, as described in M. O'Connell et al., "Band Gap Fluorescence from Individual Single-Walled Carbon Nanotubes," *Science,* Vol. 297, 26 July 2002, pgs. 593-596. Thus prepared, nanotubes may be dissolved or suspended in water or an organic solvent, such as ether, dichloromethane, trichloromethane, acetone, methanol, or ethanol, as examples. The nanotubes also may be suspended in a gaseous composition and blown across the substrate to thereby form the fluid flow. From the step of combining the nanotubes with a fluid, the method proceeds to step 220 wherein the nanotubes are aligned in a fluid flow. The fluid flow will have a flow speed, density and viscosity to yield a low Reynolds number, a value less than thirty. As will be described in following paragraphs, there are a number of different methods for achieving nanotube alignment with the fluid flow, that is, orienting the longitudinal axis of the nanotubes in a direction that is parallel to the direction of fluid flow. Those methods can be used individually or combined to be used together simultaneously or in succession.

In step 230, a substrate having a lattice corresponding to the lattice of the nanotubes is provided and oriented such that the axis of the lattice is disposed at a predetermined angle relative to the flow of fluid that is directed over the substrate. For adsorbing carbon nanotubes, a material having a hexagonal lattice structure is used, like that of a highly oriented pyrolytic graphite substrate. It should be understood that other materials having a hexagonal lattice structure, such as, but not limited to, boron nitride, may also be used. While the form of the commensurations would be more complex than that for graphite, the locking angles would still be determinable. The predetermined angle of the lattice axis is selected based on the particular helicity of the nanotubes to be separated from the nanotube-containing fluid. The flow of aligned nanotubes over the oriented substrate lattice provides for a preferential adsorption of nanotubes having the particular helicity. The fluid containing the nanotubes that have not been adsorbed to the substrate is collected in step 240. This collected effluent may be recycled, as indicated by the dashed line in the diagram, to repeat the process to extract further nanotubes of the selected helicity. The collected effluent also may be recycled to collect nanotubes of another helicity. Subsequent to collection of the effluent in step 240, the nanotubes that have been adsorbed are removed from the substrate in step 250.

The nanotubes that have been adsorbed to the substrate can be removed by a number of different methods. For instance, when the nanotubes have been adsorbed from a suspension thereof, the nanotubes may then be subsequently removed utilizing a solvent, in a process that may include functionalization of the adsorbed nanotubes to increase their solubility. In addition to end and side functionalization, the technique for increasing solubility by polymer wrapping also may be utilized. When the nanotubes combined with the fluid are dissolved in a solvent and flowed across the substrate, the nanotubes which have been adsorbed out of that solution can be removed from the substrate by dissolving the adsorbed nanotubes in a solvent in which they are relatively more soluble than the fluid originally used to deposit them and effect the separation. Here again, the solubility of the adsorbed nanotubes can be enhanced by side functionalization, end functionalization, or polymer wrapping. The dissolution removal process may include or be performed in combination with the addition of energy from heating, electric fields, mechanical vibration, etc., to enhance this process. The adsorbed nanotubes also may be mechanically "wiped off" of the substrate, "washed off" utilizing a flow of a liquid or a gas directed parallel to the planar surface of the substrate, or removed through the use of centrifugation, to force off the adsorbed nanotubes as the substrate is subjected to angular acceleration. As an alternative, both the substrate and nanotubes can be coated with single chain alkanes to accentuate the selectivity of the process. The nanotubes can then be removed from the substrate with dissolution of the coating.

Figure 6:
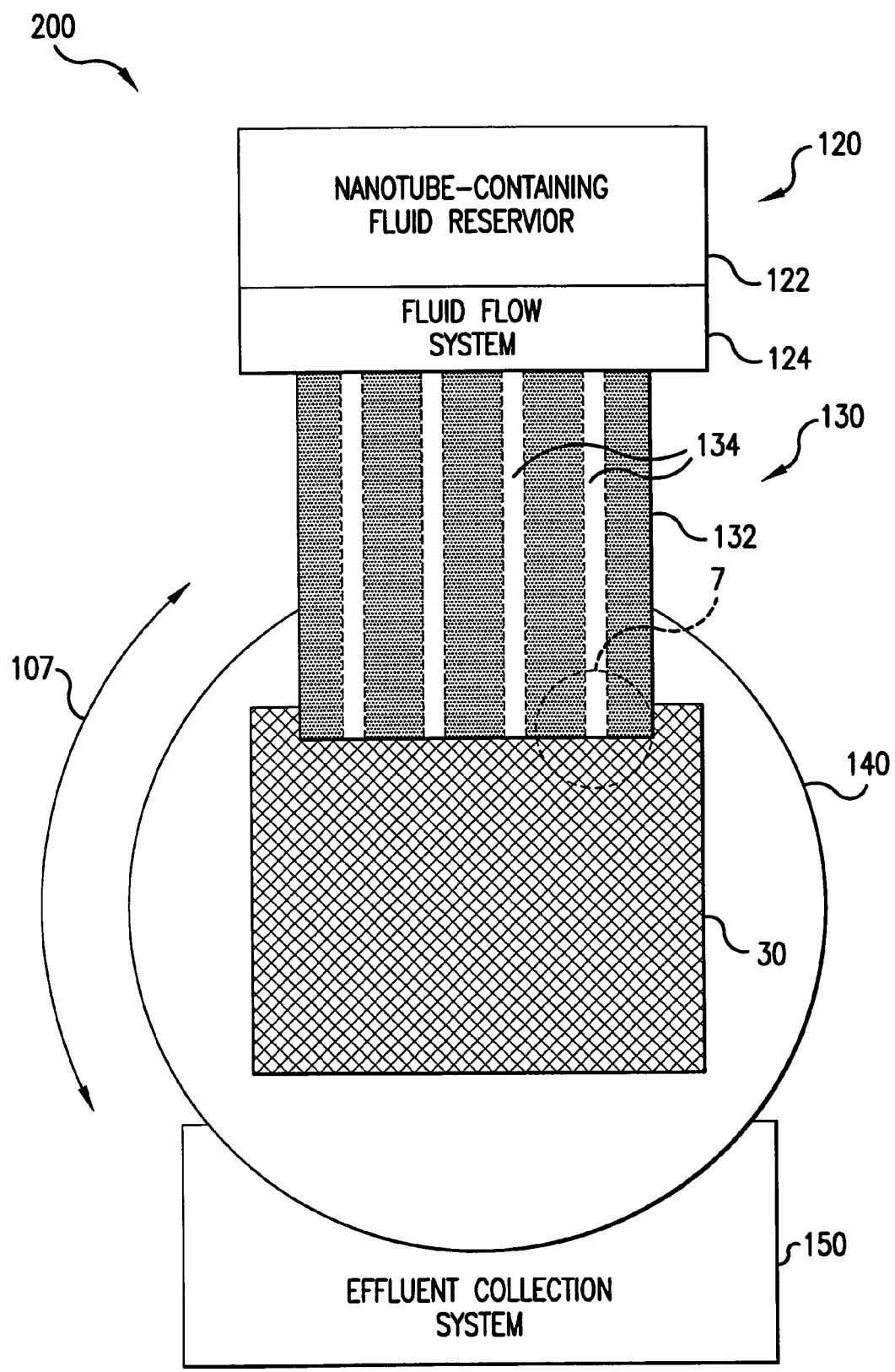
FIG. 6. is a schematic illustration of a system for practicing the present invention.

A schematic illustration of a system 200 for practicing the bulk separation process is shown in FIG. 6. The system 200 includes a fluid flow system 120 which incorporates the necessary reservoirs for the nanotubes and solvent or suspension fluids being used to transport the nanotubes to the surface of the substrate. The fluid flow system 120 includes any required pumps or flow control devices 124 required to provide the desired flow rate of the nanotube-containing fluid across the substrate. A dispensing assembly 130 has at least one outlet in proximity to the substrate 30. At least one inlet is coupled in fluid communication with the container 122 of nanotube-containing fluid within system 120. The dispensing assembly 130 is structured to provide alignment of the nanotubes such that the longitudinal axes of the nanotubes is oriented in the direction of the fluid flow through assembly 130.

Figure 7:
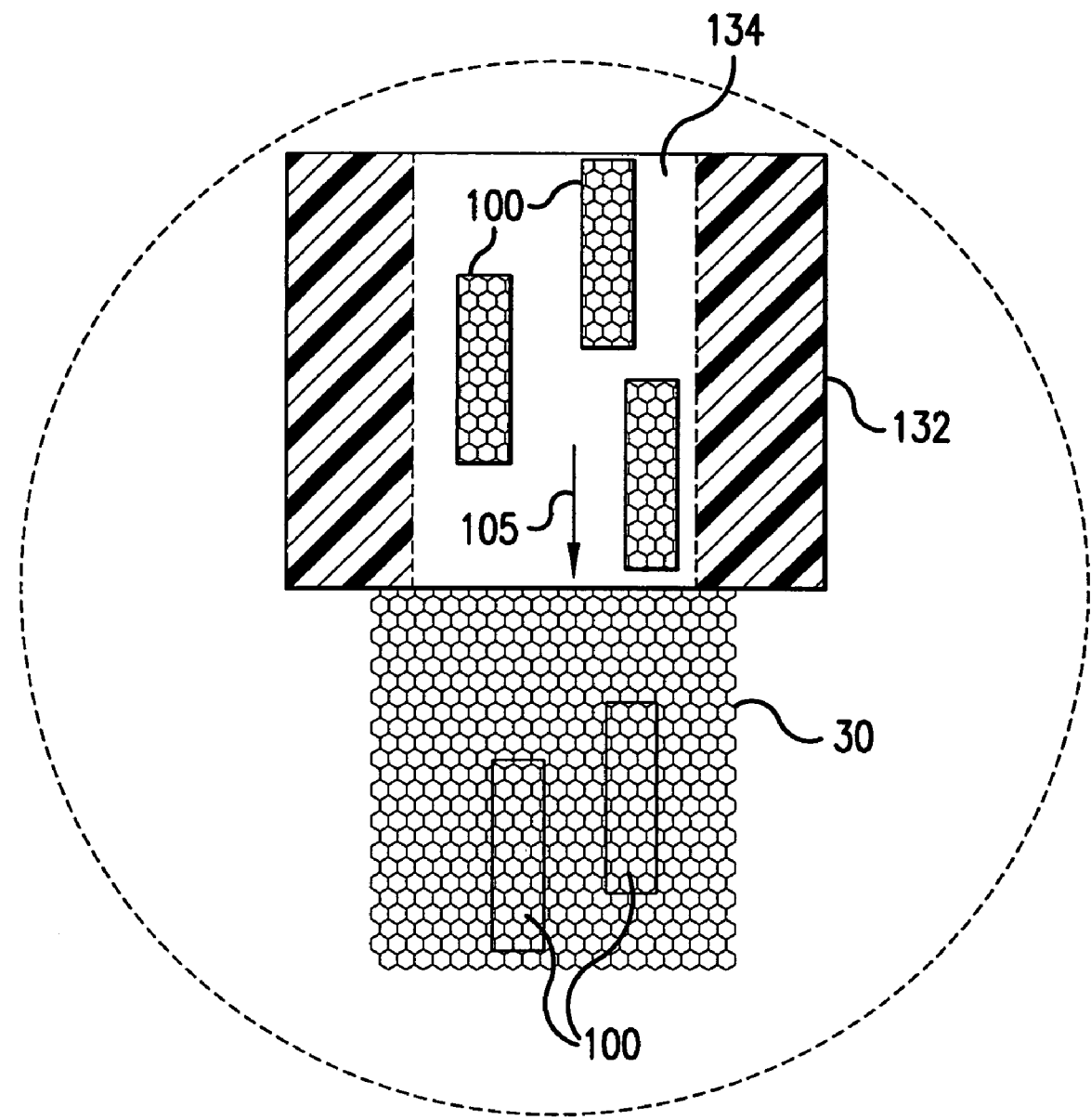
FIG. 7. is a enlarged partial view of the system shown in FIG. 6.

One method of providing the alignment of the nanotubes is through the use of confinement-based alignment. To implement that method, dispensing assembly 130 includes a conduit 132 having at least one flow channel 134 dimensioned to expose a large percentage of the nanotubes to the confinement-based alignment phenomena. The confinement-based alignment method is implemented utilizing a channel 134 having a diameter or width dimension that is in the range of ten to one thousand times larger than the diameter of the nanotubes flowing therethrough. In order to maximize the efficiency of dispensing assembly 130, conduit 132 is provided with a plurality of parallel channels 134 through which the nanotube-containing fluid flows. Thus, as shown in the enlarged view in FIG. 7, nanotubes 100 flowing through a channel 134 have their longitudinal axes aligned with the flow direction, represented by the arrow 105. The nanotubes 100 flow through the conduit 132 onto and/or over the substrate 100. Those nanotubes whose helicities correspond to the orientation of the lattice structure will be adsorbed to the substrate, while the others flow over the substrate into the effluent collection system 150. A flow rate for the nanotube-containing fluid within the approximate range of 10-1000 mm/second is provided at the outlet of each channel 134.

Shear based alignment occurs when the speed of fluid flow decreases as a surface is progressively approached. This change in fluid velocity with respect to position acts to align the tubes in the direction of flow and at an angle to the substrate plane, as is well known in the art. The effect is independent of channel width.

Establishing an extensional flow is another alignment method. An extensional flow is established by passing the flow through a constriction. When fluid flows through a constriction, the flow velocity increases. If a nanotube is suspended in the fluid passing through the constriction, then one end, a downstream-most end, of the nanotube will be pulled in the direction of the flow by the higher velocity fluid. The opposing end of the nanotube, being in a lower velocity fluid, falls behind to be directed upstream. The oppositely directed forces acting on the ends of the nanotube act to substantially align the longitudinal axis of the nanotube in the flow direction. An example of an extensional flow alignment method is embodied in dispensing assembly 130", shown in FIGS. 10 and 11, which assembly may substitute for dispensing assembly 130. Such an extensional flow alignment method may be alternately implemented in the conduit 132 of dispensing assembly by incorporating a constriction section leading to each channel 134. Conduit 132'" is formed with at least one flow channel 134' having a bore extending from an end of the conduit 1322 to a constriction section 1344. The nanotubes align in the flow direction in the constriction section 1344, which section leads to a narrow channel section 1346. The nanotubes maintain a degree of alignment as they pass through the narrow channel section 1346.

Irrespective of which dispensing assembly is used, the substrate 30 is disposed on a turntable 140, as shown in FIG. 6, allowing the substrate to be angularly displaced, as indicated by directional arrow 107, so that the substrate is oriented with the lattice axis aligned at a predetermined angle with respect to the flow direction 105. Alternately, the fluid flow system 120 and dispensing assembly 130 may be mounted on a base that is angularly displaceable with respect to the substrate, as indicated by directional arrow 107, in order to orient the fluid flow direction 105 at a desired angle with respect to the lattice axis of the substrate. The effluent collected by system 150 may be recycled to the reservoir 122, or alternately, to another system 200, with the substrate thereof having a lattice axis oriented at either the same predetermined angle with the substrate as had been used previously, or at another angle selected to separate nanotubes of a different helicity.

Once the flow of nanotube-bearing fluid from reservoir 122 has stopped, the substrate 30 may be taken from turntable 140 for processing to remove the adsorbed nanotubes of the desired chirality. Alternately, the removal process can be carried out on turntable 140 and effluent collection system 150 then being utilized for collecting the nanotubes which had been adsorbed to the substrate, subsequent to the previously collected effluent being purged therefrom.

Figure 10:
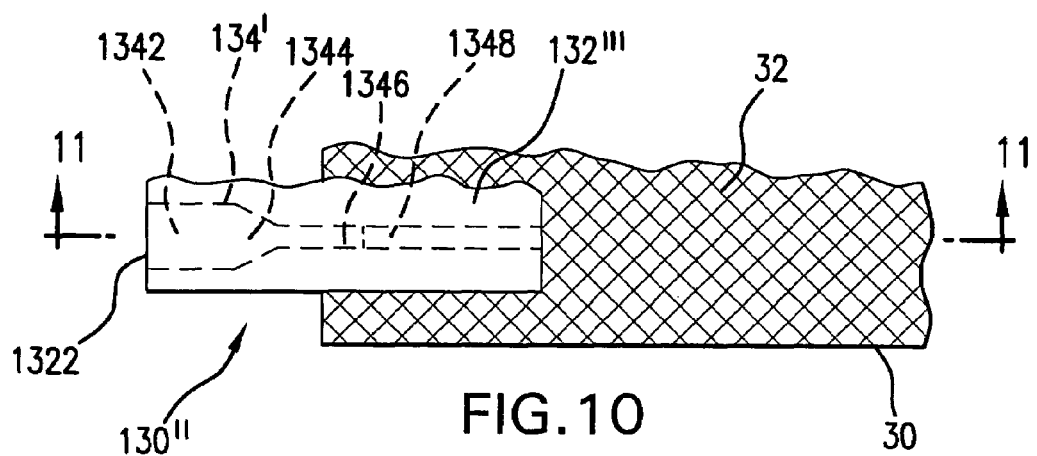
FIG. 10 is a partial schematic illustration of a further alternate construction for aligned fluid flow of nanotubes in the present invention.
Figure 11:
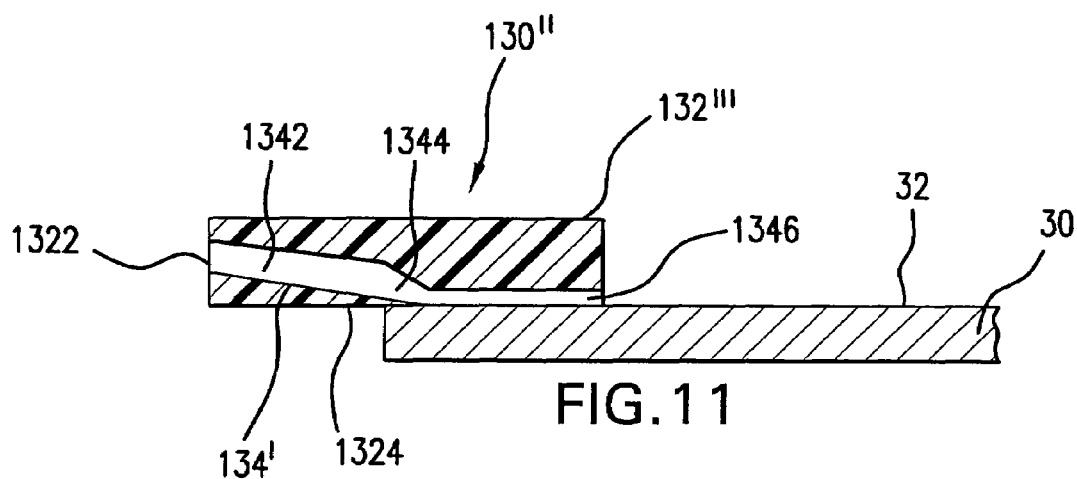
FIG. 11 is a cross-sectional view taken along the section line 11-11 of FIG. 10; and, FIG. 12 is a schematic view of the construction of FIG. 10 illustrating the movement of the conduit relative to the substrate.
Figure 12:
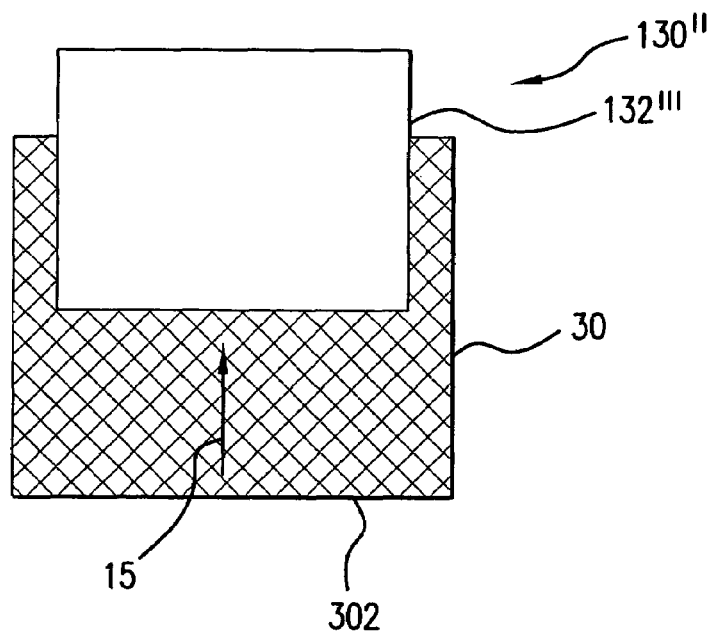

The dispensing assembly 130", shown in FIGS. 10-12 represents an alternate dispensing assembly structure. Each flow channel 134' of conduit 132''' is formed with a portion 1348 of the narrow channel section 1346 that is open to the bottom surface 1324 of conduit 132'''. By that arrangement, the upper surface 32 of substrate 30 together with conduit 132''' defines a closed contour passage. The aligned nanotubes of a helicity corresponding to the substrate lattice orientation, that pass through the portion 1348 of the narrow channel section 1346, are free to adhere to the exposed substrate that closes the contour of the passage. The conduit is initially disposed at or near the distal edge 302 of substrate 30 and then displaced therefrom, as indicated by the directional arrow 15, in correspondence with the fluid flow. By that arrangement, a fresh portion of the substrate is continually exposed to the fluid flow until the proximal end portion of the substrate is reached. That process results in the adhered nanotubes being disposed in one or more lines, depending on the number of flow channels 134', on the substrate 30. It should be understood that flow channels 134' can be used to dispense nanotubes on the substrate 30 regardless of the alignment method being employed.

Figure 8:
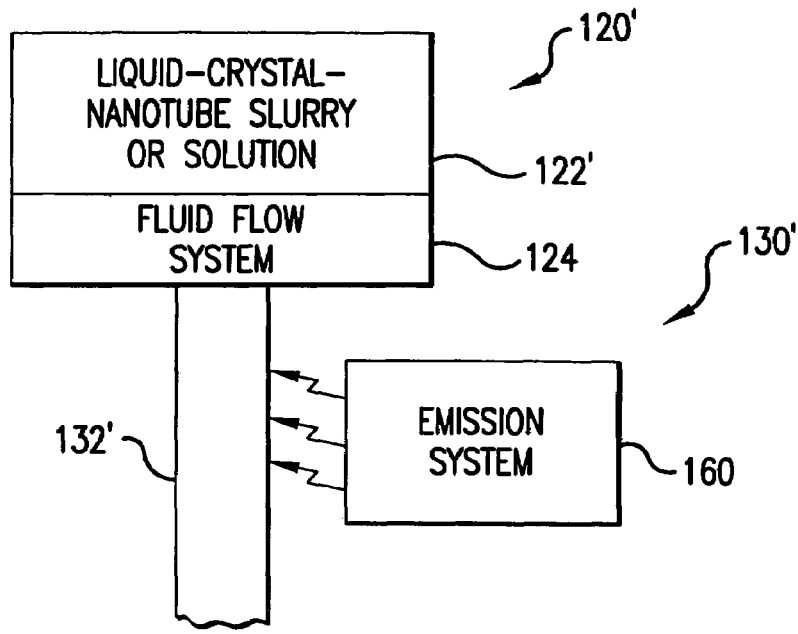
FIG. 8. is a partial schematic illustration of an alternate construction for aligned fluid flow of nanotubes in the present invention.

Referring now to FIG. 8, there is shown an alternate configuration for a portion of system 200 wherein the dispensing assembly 130' includes a conduit 132' through which a liquid crystal-nanotube slurry or solution flows from the reservoir 122' of the fluid flow system 120'. Rather than use sheared flow as the means for aligning the longitudinal axes of the nanotubes with the direction of fluid flow, dispensing assembly 130' utilizes the phenomenon of liquid crystal alignment to exert a torque on the nanotubes and consequently align the nanotubes in the same direction. The nanotubes are dissolved or suspended in a thermotropic liquid crystal composition, such as 4'-pentyl-4-cyanobiphenyl, known by the designation 5CB, or a mixture of alkyl- and alkoxycyanobiphenyls, known by the designation E7. It is known in the art that the nanotube alignment results from orientational coupling to the nematic matrix, and that liquid crystal alignment may be achieved by forming microgrooves in the conduit 132', or through the use of magnetic or electric fields provided by emission system 160, or a combination thereof. The field(s) generated by emission system 160 function to align the liquid crystal molecules, which in turn effect the alignment of the nanotubes.

Figure 9:
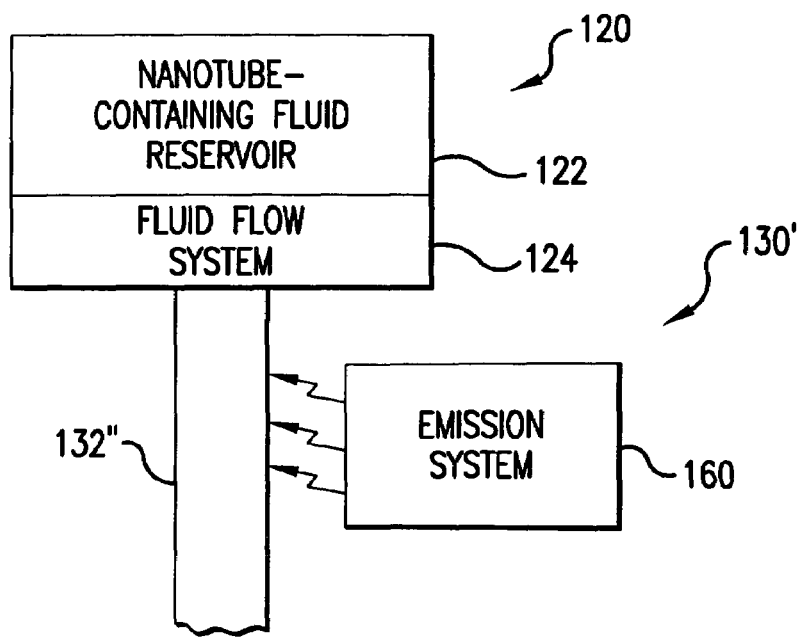
FIG. 9 is a partial schematic illustration of another alternate construction for aligned fluid flow of nanotubes in the present invention.

Another alternate configuration for a portion of system 200 is depicted in FIG. 9, the nanotube-containing fluid within the reservoir 122 of system 120 may be functionalized with substituents that exhibit a greater directional electric or magnetic susceptibility than do the unfunctionalized nanotubes themselves. The susceptibility of the nanotubes must be larger than the ambient fluid and therefore the susceptibility of unfunctionalized nanotubes may be sufficient. Thus, as the slurry or solution of nanotubes flow through the conduit 132", they are exposed to the field(s) generated by emission system 160 and are oriented thereby. Highly acidic functional groups such as carboxyl groups and highly basic groups such as amino groups may be substituted on opposite ends of a nanotube to produce an electric dipole and thus provide the directional electric susceptibility to the field(s) generated by emission system 160.

Although this invention has been described in conjunction with specific forms and embodiments thereof, it will be appreciated that various modifications other than those discussed above may be resorted to without departing from the spirit or scope of the invention. For example, equivalent method steps may be substituted for those specifically shown and described, different solvents, surfactants or means for orienting nanotubes in a flow can be used in place of those described herein, certain processes may be used independently of other processes, and in certain cases particular sequences of method steps may be reversed or interposed, all without departing from the spirit or scope of the invention as defined in the appended claims.

What is being claimed is:

1. A method for bulk separation of single-walled tubular fullerenes based on helicity, comprising the steps of:

providing in a fluid a plurality of single-walled tubular fullerenes being of a multiplicity of different helicities, each of said plurality of single-walled tubular fullerenes having a longitudinal axis;

providing a crystalline substrate having an upper surface whose atomic lattice structure in a plane of said upper surface provides at least one energetically favored angular orientation of said longitudinal axis with respect to an axis of said lattice structure for single-walled tubular fullerenes of one helicity to be adsorbed thereto in preference to single-walled tubular fullerenes of other helicities;

establishing a flow of said fluid for transporting said plurality of single-walled tubular fullerenes with said longitudinal axes thereof in substantially parallel relationship, one with respect to another, and substantially aligned with a direction of said flow of said fluid;

directing said flow of said fluid containing said plurality of single-walled tubular fullerenes in parallel with said upper surface of said substrate and in contact therewith to pass into an effluent receiver disposed adjacent to a perimeter of said substrate, said flow being in said at least one energetically favored angular orientation to thereby preferentially adsorb and hold said single-walled tubular fullerenes of said one helicity to said upper surface of said substrate; and, removing said single-walled tubular fullerenes held to said upper surface of said substrate.

2. The method as recited in claim 1, wherein the step of establishing a flow of said fluid is preceded by the step of dissolving at least a portion of said plurality of single-walled tubular fullerenes in said fluid.

3. The method as recited in claim 1, wherein the step of establishing a flow of said fluid is preceded by the step of suspending at least a portion of said plurality of single-walled tubular fullerenes in said fluid.

4. The method as recited in claim 1, wherein the step of establishing a flow includes the step of forming a confinement-based alignment through at least one outlet passage.

5. The method as recited in claim 4, wherein said at least one outlet passage has a diameter less than one thousand times greater than a diameter of said single-walled tubular fullerenes.

6. The method as recited in claim 1, wherein the step of establishing a flow includes the step of forming an extensional flow through at least one outlet passage.

7. The method as recited in claim 6, wherein the step of forming an extensional flow includes the step of forming a constriction region within said outlet passage.

8. The method as recited in claim 7, wherein the step of forming a constriction region includes the step of forming said outlet passage with an open bottom juxtaposed on said substrate to define a closed contour passage.

9. The method as recited in claim 1, wherein the step of providing a plurality of single-walled tubular fullerenes includes the step of functionalizing said plurality of single-walled tubular fullerenes with molecular groups having one of a high electric or magnetic susceptibility.

10. The method as recited in claim 9, wherein the step of establishing a flow a flow of said fluid includes the step of using at least one electric or magnetic field directed across said fluid flow to align said longitudinal axes of said plurality of single-walled tubular fullerenes with said direction of said flow of said fluid.

11. The method as recited in claim 1, wherein the step of establishing a flow a flow of said fluid is preceded by the step of suspending said plurality of single-walled tubular fullerenes in a liquid crystal material.

12. The method as recited in claim 1, wherein the step of establishing a flow a flow of said fluid is preceded by the step of providing an outlet passage with an open bottom juxtaposed on said substrate to thereby form a closed contour passage.

13. A system for bulk separation of single-walled tubular fullerenes based on helicity, comprising:
- a container of a fluid bearing single-walled tubular fullerenes, said single-walled tubular fullerenes being of a multiplicity of different helicities and each of said single-walled tubular fullerenes having a longitudinal axis;
- a dispensing assembly having at least one outlet for discharging said fluid bearing single-walled tubular fullerenes in a directed flow and at least one inlet coupled in fluid communication with said container and spaced from said outlet, said dispensing assembly including means for aligning said longitudinal axes of said single-walled tubular fullerenes in substantially parallel relationship and in a direction of said directed flow of said fluid;
- a crystalline substrate having an atomic lattice structure with an axis defined in a plane of an exposed upper surface there of said outlet of said dispensing assembly being positioned with respect to said substrate for said directed flow of said fluid to be in parallel with said upper surface of said substrate and in contact therewith, wherein said of said atomic lattice structure is disposed in a predetermined angular relationship with respect to said directed flow of said fluid from said at least one outlet of said dispensing assembly, said angular relationship being selected to energetically favor adsorption of said single-walled tubular fullerenes of one helicity in preference to single-walled tubular fullerenes of other helicities, said energetically favored adsorption being sufficient to hold said single-walled tubular fullerenes of said one helicity to said upper surface of said substrate as said fluid bearing single-walled tubular fullerenes flows across said upper surface of said substrate; and,
- a drainage assembly disposed adjacent to a portion of said substrate distal from said dispensing assembly for receiving any of said fluid bearing single-walled tubular fullerenes not held on said upper surface of said substrate.

14. The system as recited in claim 13, wherein said alignment means includes at least one outlet passage disposed in fluid communication with said at least one outlet of said dispensing assembly, said at least one outlet passage being adapted to form a confinement-based alignment therethrough.

15. The system as recited in claim 14, wherein said at least one outlet passage has a diameter less than one thousand times greater than a diameter of said single-walled tubular fullerenes.

16. The system as recited in claim 13, wherein said fluid includes a liquid crystal material combined with, said single-walled tubular fullerenes to suspend said single-walled tubular fullerenes therein, said suspension being flowed across said upper surface of said substrate said substrate.

17. The system as recited in claim 13, wherein said at least one outlet of said dispensing assembly is defined by an outlet passage with an open bottom juxtaposed on top of said substrate.

18. The system as recited in claim 13, wherein said alignment means includes an emission system in proximity to at least one outlet passage disposed in fluid communication with said at least one outlet of said dispensing assembly, said emission system exposing said fluid bearing single-walled tubular fullerenes to one of a magnetic field or an electric field to align said longitudinal axes of said single-walled tubular fullerenes with said flow.

19. The system as recited in claim 13, further comprising a turntable for displaceably supporting said substrate thereon.

* * * * *